A. PALIS.
MOTOR CAR PROTECTION DEVICE.
APPLICATION FILED NOV. 13, 1913.

1,107,832.

Patented Aug. 18, 1914.

Witnesses:

Inventor:
Alexander Palis,
by Franks Anneman,
Atty.

UNITED STATES PATENT OFFICE.

ALEXANDER PALIS, OF SPANDAU, GERMANY.

MOTOR-CAR PROTECTION DEVICE.

1,107,832.  Specification of Letters Patent.  Patented Aug. 18, 1914.

Application filed November 13, 1913.  Serial No. 800,806.

*To all whom it may concern:*

Be it known that I, ALEXANDER PALIS, subject of the German Emperor, residing at 6 Potsdamer street, Spandau, Germany, have invented certain new and useful Improvements in Motor-Car Protection Devices for High-Speed Journeys, of which the following is a specification.

The subject of the present invention is a motor-car protection device for high speed journeys, in order to avert automatically ropes stretched across the road or other obstacles encountered in driving, or to neutralize the effect of the shock in such a manner as to prevent an accident.

Figure 1:
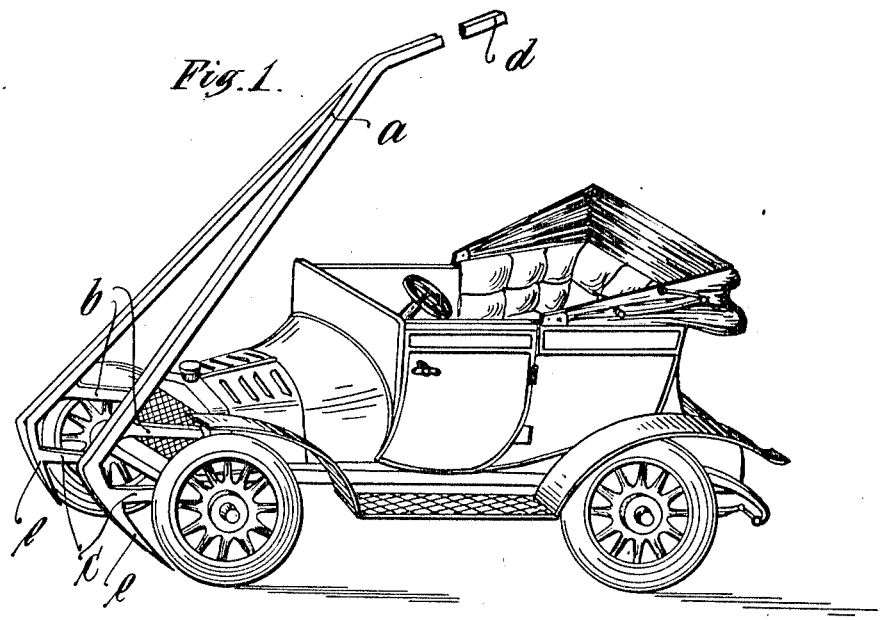
Figure 2:
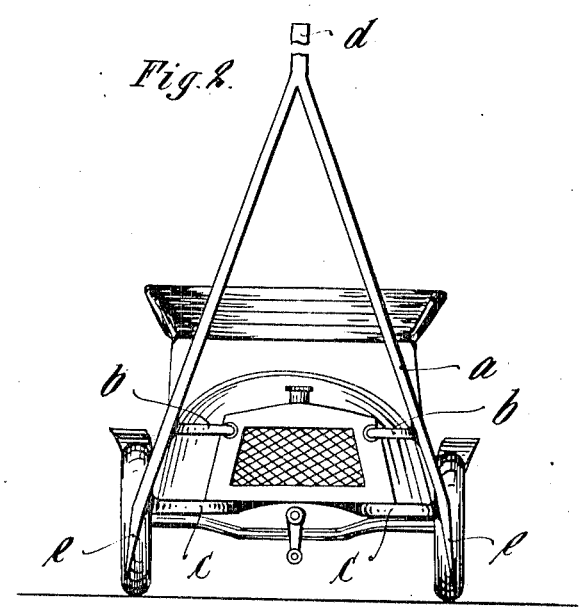

The accompanying drawing represents the device: Figure 1 in perspective, Fig. 2 in front view.

On a suitable part of the car the protecting bow $a$, which is provided with fastening supports $b$, $c$, and which is forked at the bottom and tapers off at the top to the end $d$, is fastened in a suitable manner. The lower ends $e$ of the fork $a$ are directed obliquely downward toward the wheels at a small height above the ground.

The upper part $d$ of the protecting device is arranged at such a height that the obstacle, *e. g.* rope, glides over the heads of the occupants. If on the other hand the obstacle is near the ground the oblique ends $e$ of the protecting bow $a$, which lead obliquely downward, divert the obstacle in the wire rope downward. If several ropes are stretched across a road, the protecting bow diverts the obstacles upward and downward by means of the peculiar angle at which the upper and lower parts of the protecting bow are placed. If this does not however entirely succeed, the vehicle is jammed with the protecting bow between the ropes and the violent shock is weakened through the protecting bow being brought obliquely upward and downward in front of the wheels with a certain brake effect, whereby an accident is avoided.

What I claim as my invention in the United States of America is:

1. In combination with a road vehicle, a guard comprising a rod having a bifurcated end, the furcations thereof being secured to the forward portion of the vehicle, the opposite end of the guard extending upwardly and rearwardly and terminating at a point directly above the vehicle as shown and described.

2. In combination with a road vehicle, a guard comprising a rod having a bifurcated end, the furcations thereof being secured to the forward portion of the vehicle and in front of the front wheels thereof, a portion of each furcation extending downwardly and rearwardly to form wheel guards, and the opposite end of the rod extending upwardly and rearwardly and terminating at a point directly above the motor vehicle.

In testimony whereof, I affix my signature in the presence of two witnesses.

ALEXANDER PALIS.

Witnesses:
 WOLDEMAR HAUPT,
 HENRY HASPER.